United States Patent
Du et al.

(10) Patent No.: US 9,160,100 B2
(45) Date of Patent: Oct. 13, 2015

(54) ANGLE ADJUSTABLE CONNECTING MODULE

(71) Applicants:MAINTEK COMPUTER (SUZHOU) CO., LTD., JiangSu (CN); UNIHAN CORPORATION, Taipei (TW)

(72) Inventors: Jiang Du, JiangSu (CN); Chien-Jung Tu, Taipei (TW)

(73) Assignees: MAINTEK COMPUTER (SUZHOU) CO., LTD., Jiangsu (CN); PEGATRON CORPORATION, Taipei (TW)

( * ) Notice: Subject to any disclaimer, the term of this patent is extended or adjusted under 35 U.S.C. 154(b) by 180 days.

(21) Appl. No.: 13/945,486

(22) Filed: Jul. 18, 2013

(65) Prior Publication Data
US 2014/0028247 A1 Jan. 30, 2014

(30) Foreign Application Priority Data
Jul. 25, 2012 (CN) ...................... 2012 2 0361603 U

(51) Int. Cl.
| | |
|---|---|
| H02J 7/00 | (2006.01) |
| H01R 13/58 | (2006.01) |
| H01R 35/00 | (2006.01) |
| H02J 7/02 | (2006.01) |
| H02J 5/00 | (2006.01) |

(52) U.S. Cl.
CPC ............ *H01R 13/5841* (2013.01); *H01R 35/00* (2013.01); *H02J 7/0042* (2013.01); *H02J 5/005* (2013.01); *H02J 7/025* (2013.01); *H02J 2007/0062* (2013.01)

(58) Field of Classification Search
USPC .................................. 320/107–108, 110–115
See application file for complete search history.

(56) References Cited

U.S. PATENT DOCUMENTS

| | | | |
|---|---|---|---|
| 8,089,463 B2 | 1/2012 | Wu et al. | |
| 2010/0315041 A1* | 12/2010 | Tan | ............................... 320/115 |
| 2012/0013291 A1* | 1/2012 | Lahti et al. | ..................... 320/107 |
| 2012/0169276 A1* | 7/2012 | Wang et al. | .................... 320/108 |

FOREIGN PATENT DOCUMENTS

| | | |
|---|---|---|
| CN | 201438593 | 4/2010 |
| CN | 201846114 | 5/2011 |

* cited by examiner

*Primary Examiner* — Paul Dinh
(74) *Attorney, Agent, or Firm* — Muncy, Geissler, Olds & Lowe, P.C.

(57) ABSTRACT

An angle adjustable connecting module comprises a casing and a connecting assembly. The casing has an opening. The connecting assembly includes a connecting portion, a shaft and at least an elastic member. The connecting portion is connected with the shaft, an end of the elastic member is connected with the shaft and the other end of the elastic member is connected with the casing, and the shaft is rotatably disposed at the casing for allowing a part of the connecting portion to be movably exposed to the opening. Thus, the wear problem generated as connecting with the game controller can be reduced for ensuring that the functions are normally operated to extend the lifetime of the game controller.

8 Claims, 5 Drawing Sheets

ANGLE ADJUSTABLE CONNECTING MODULE

CROSS REFERENCE TO RELATED APPLICATIONS

This Non-provisional application claims priority under 35 U.S.C. §119(a) on China Patent Application No(s). 201220361603.0 filed on Jul. 25, 2012, the entire contents of which are hereby incorporated by reference.

BACKGROUND OF THE INVENTION

1. Field of Invention

This disclosure relates to a connecting module and, more particularly, to an angle adjustable connecting module.

2. Related Art

To date, conventional charge methods of a game controller are mainly wired and wireless. However, the wired charge method is limited by the length of the wire and the space. Moreover, it is not easy to satisfy the need of playing and charging at the same time due to the abovementioned linear limitation of the wire. There is another barrier of the conventional charge method, that is, it is necessary to plug and unplug the connector before and after charging so that the connector is easily worn after repeating the above operation. More particularly, the game controller generally has an arc modeling for fitting in with human-factor concerns, thus plugging and unplugging the connector will be not as easy as the flat design. After using in a long term, it will increase the damage of the connector itself, decrease the lifetime of the game controller and further affect the quality of charging. For these reason, the wireless charge method is becoming the main charge method in order to decrease the times of plugging and unplugging during charging.

In the wireless charge method, the conventional method is performed by using a wireless charge module together with a connector of universal serial bus to connect with the game controller to charge. Although the charging will not be interrupted during the game due to wireless and is capable of decreasing the times of plugging and unplugging the wireless charge module, the wear problem of the connector still cannot be avoided as same as the wired charge method because it still needs to disconnect with the connector every time or it needs to be stored. Thus, the port of the game controller will become loose due to the wear and the quality and efficiencies of the charging will be further affected thus to dramatically decrease the life of the game controller for long term.

SUMMARY OF THE INVENTION

The disclosure is to provide an angle adjustable connecting module for reducing the wear problem generated as connecting with the game controller for ensuring the functions are normally operated to extend the life time of the game controller. Preferably, the connecting module can be used in an operation of repeatedly and frequently plugging and unplugging, such as charging, for maintaining the quality of the assembly and the efficiency of the operation.

The present invention can be performed by the following embodiments.

The embodiment of the present invention provides an angle adjustable connecting module, and the connecting module comprises a casing and a connecting assembly. The casing has an opening. The connecting assembly includes a connecting portion, a shaft and at least an elastic member. The connecting portion is connected with the shaft, an end of the elastic member is connected with the shaft and the other end of the elastic member is connected with the casing, and the shaft is rotatably disposed at the casing for allowing a part of the connecting portion to be movably exposed to the opening.

In one embodiment of the invention, the elastic member is a torsion spring.

In one embodiment of the invention, the connecting portion comprises a connector of universal serial bus, a connector of firewire or a connector of high definition multimedia interface.

In one embodiment of the invention, the angle adjustable connecting module further comprises a charge module, and the charge module is assembled with the casing.

In one embodiment of the invention, the charge module comprises a wireless charge receiving module or a wired charge receiving module.

In one embodiment of the invention, the connecting portion is capable of connecting with a game controller and the game controller is cooperated with the connecting assembly through an arc surface.

In one embodiment of the invention, the connecting portion is connected with the game controller along a connecting direction, the connecting direction is perpendicular to the shaft, and the connecting portion is capable of rotating an angle with respect to the connecting direction.

In one embodiment of the invention, the angle is ranged from 15 degrees to 20 degrees.

According to the above, the angle adjustable connecting module of the present invention allows the connecting portion of the connecting assembly to be movably exposed by setting up an opening on the casing, thereby the wear problems, which are generated at a port of the connecting portion or the game controller because the arc surface appearance of the game controller results in misalignment or the incorrect direction of applying force, can be avoided.

Compared to the conventional fixed connecting assembly, which is limited to be plugged or unplugged with a single angle during assembling due to the lacks of the movability and thereby damage the connector easily, the angle adjustable connecting module of the present invention makes the angle more flexible by disposing the shaft and the elastic member to decrease the wear problems and be used easily. Also, under repeatedly and frequently using, the quality and efficiency of the transmitting in connecting can be maintained, and the lifetime of the electronic product can be extended. More particularly, when the present invention is used for the charging of the game controller, because the reduction of the wear, the connecting module and the game controller can be tightly connected with each other to ensure that the charging can be effectively processed even though it has been used for many times.

DETAILED DESCRIPTION OF THE INVENTION

An angle adjustable connecting module in preferred embodiments of this invention is described hereinbelow according to related drawings, and the same elements are marked by the same reference numbers.

Figure 1A:
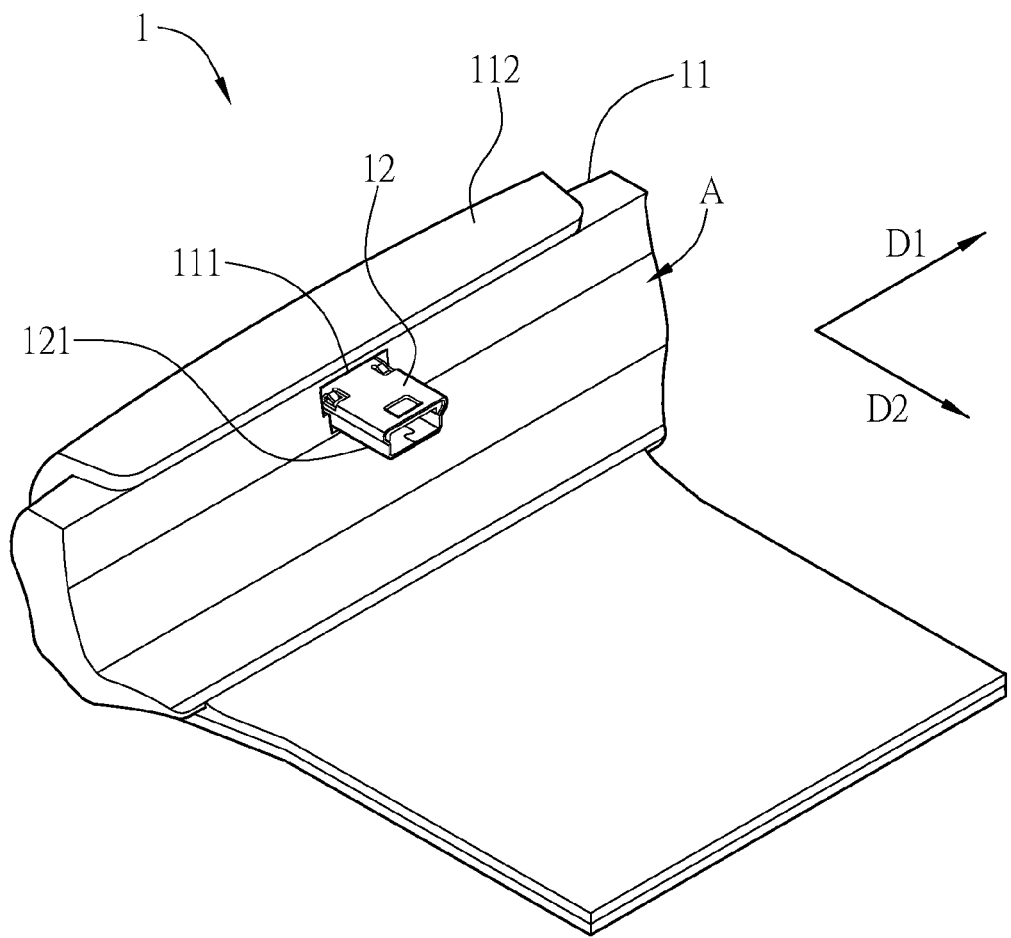
FIG. 1A is a schematic diagram showing a preferred embodiment of an angle adjustable connecting module according to the present invention.
Figure 1B:
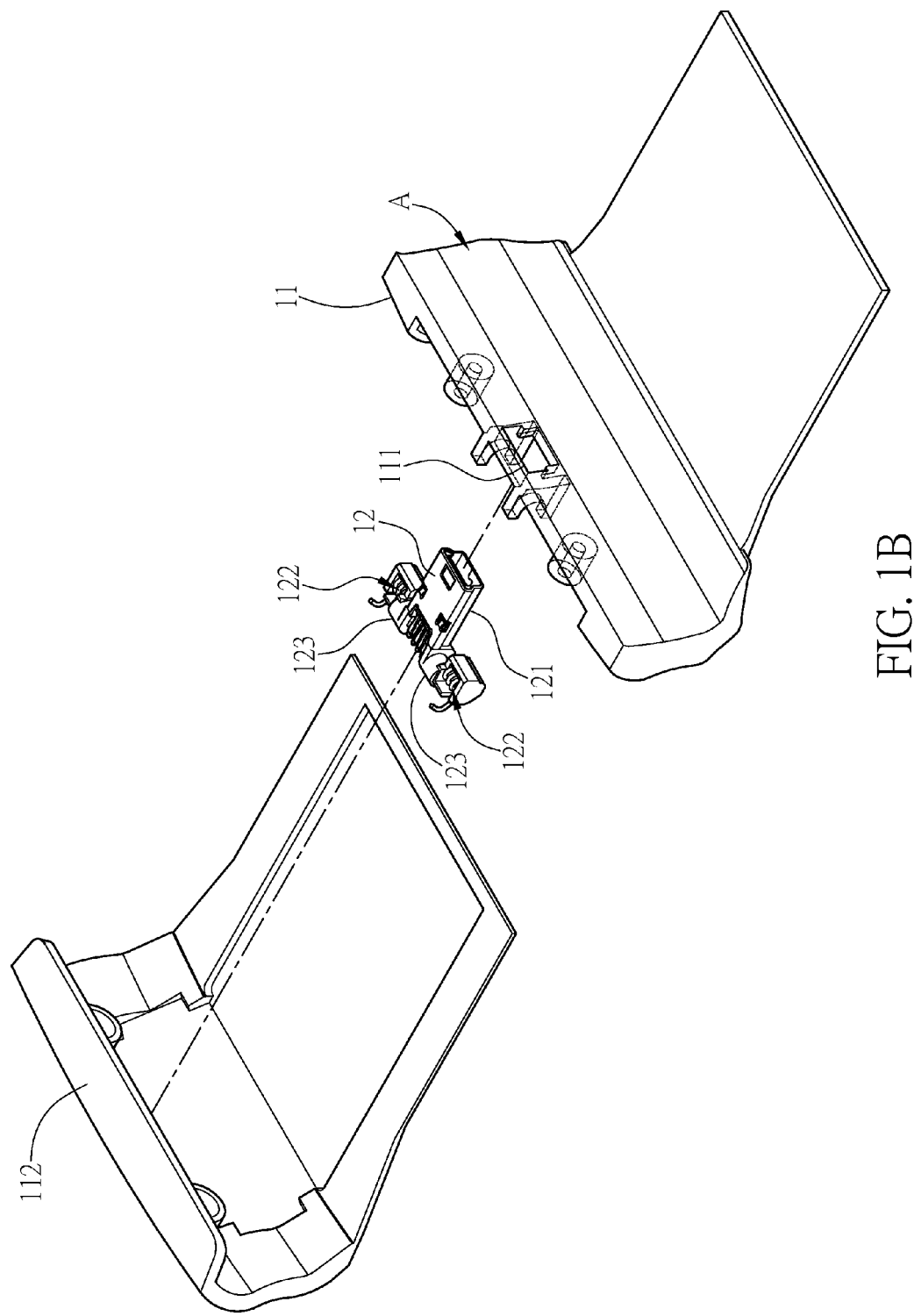
FIG. 1B is an exploded schematic diagram showing the angle adjustable connecting module of FIG. 1A.
Figure 2:
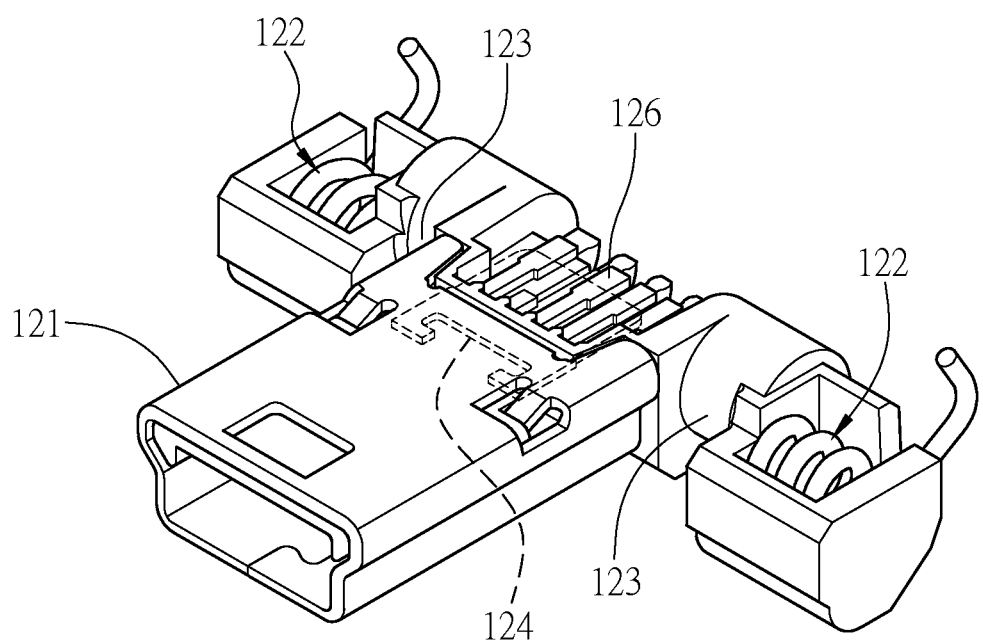
FIG. 2 is an enlarged schematic diagram showing the angle adjustable connecting module of FIG. 1A after detaching the casing.
Figure 3:
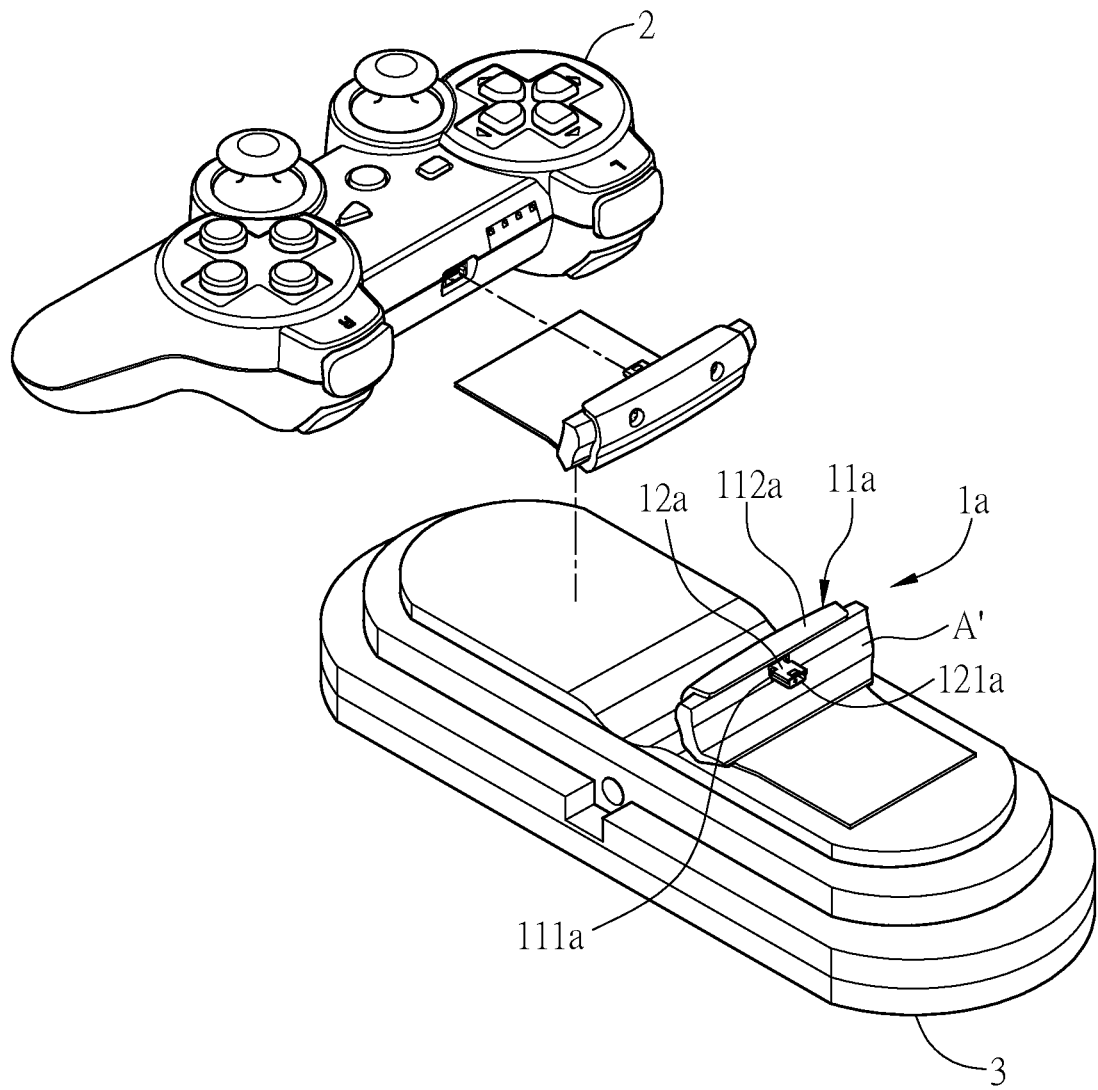
FIG. 3 is a combination schematic diagram showing an embodiment of using the angle adjustable connecting module of the present invention together with a game controller and a charge module.

Please simultaneously refer to FIG. 1A, FIG. 1B and FIG. 2. FIG. 1A is a schematic diagram showing a preferred embodiment of an angle adjustable connecting module according to the present invention, FIG. 1B is an exploded schematic diagram showing the angle adjustable connecting module of FIG. 1A, and FIG. 2 is an enlarged schematic diagram showing the angle adjustable connecting module of FIG. 1A after detaching the casing. Please refer to FIG. 1A first, the angle adjustable connecting module 1 comprises a casing 11 and a connecting assembly 12. The connecting assembly is capable of being connected with a game controller (as shown in FIG. 3). Because the game controller is always designed to have an arc surface appearance, a connecting surface A of the angle adjustable connecting module, which is connected with the game controller, can be an arc surface for enhancing the strength of fixing the game controller to the angle adjustable connecting module to increase the stability. That is, the game controller and the connecting assembly 12 are cooperated through an arc surface. In the meantime the casing 11 further comprises a buckling portion 112, and the buckling portion 112 is also used to strengthen the combination of the game controller. However, the present invention is not limited thereto. Also, the casing 11 has an opening 111 on the connecting surface A.

In addition, please refer to FIG. 2, the connecting assembly 12 and the members thereof are described first. The connecting assembly 12 including a connecting portion 121, an elastic member 122, a shaft 123 and a plurality of pins 126.

The connecting portion 121 can use a universal serial bus ("USB" for short) as an embodiment, but the present invention is not limited thereto. In other embodiments, the connecting portion can be an IEEE 1394 high speed connector, an Ethernet connector, a telephone connector, a firewire connector or a high-definition multimedia interface connector. An end of the connecting portion 121 is connected with the shaft 123, and the shaft 123 is rotatably disposed at the casing 11 to be capable of rotating with respect to the casing 11 for further allowing the connecting portion 121 to be capable of rotating an angle with respect to the casing 11.

An end of the elastic member 122 is connected with an end of the shaft 123. In the present embodiment, the connecting assembly 12 has two elastic members, and the elastic members are disposed at and connected with both ends of the shaft 123, respectively. The connection between the shaft 123 and the elastic member 122 can fix the position of the elastic member 122 in the angle adjustable connecting module 1. Since the end of the elastic member 122 is connected with the shaft 123 and the other end of the elastic member 122 can be fixed with the casing 11, the elastic member 122 will storage an elastic force when the connecting portion 121 and the shaft 123 rotate an angle with respect to the casing 11. Therefore, the connecting portion 121 and shaft 123 will return to their original position after removing the external force. In short, the elastic member 122 can allow the connecting assembly 12 to automatically rest by the stored elastic force after the angle adjustable connecting module 1 and the game controller are detached. In the present embodiment, the elastic member 122 uses a torsion spring as an example, but it is not limited thereto.

Please refer to FIG. 1A, a part of the connecting portion 121, which is exposed to the opening 111, is movable since the opening 11 of the casing 11 is larger than the dimension of the connecting portion 121 of the connecting assembly 12. More specifically, on one hand, the exposed part can rotate by the shaft 123 and movably change the angle, on the other hand, it can movably reset through the elastic member 122.

Compared to the conventional connecting method, which the connecting portion is fixed on the connecting module thus to be easily worn during connecting with the game controller, the angle adjustable connecting module 1 of the present invention allows the connecting portion 121 to rotate around an axis D1 (that is, the direction of the shaft 123) within the opening 111 by the elastic member 122 when the game controller is detached or assembled. Moreover, the direction of the axis D1 and that of the assembling axis (a connecting direction of the game controller) are different, and the axis D1 herein is perpendicular to the assembling axis D2. In other words, the connecting portion 121 is connected with the game controller 2 along the connecting direction, and the connecting direction is perpendicular to the shaft 123. In the present embodiment, the exposed part of the connecting portion 121 can rotate an angle θ with respect to the assembling axis D2, therefore, the wear problem can be reduced and the lifetime of both sides can be extended due to the buffering property of the movable angle θ even though the initial angle of detaching or assembling is not correct or the direction of applying force is not appropriate. In the present embodiment, the angle is ranged from 15 degrees to 20 degrees, but it is not limited thereto. In other embodiments, the angle can be an angle larger than 0 degree and smaller than 90 degrees.

In addition, the angle adjustable connecting module of the present invention is preferably used together with a game controller and a charge module, and the charge module can be a wired charge module or a wireless charge module. Please refer to FIG. 3, and it FIG. 3 is a combination schematic diagram showing an embodiment of using the angle adjustable connecting module 1a of the present invention together with a game controller 2 and a charge module 3. The charge module 3 is assembled with the casing 11a and uses the wireless charge module as an example in the present embodiment. However, it is not limited thereto. Moreover, in the present embodiment, the angle adjustable connecting module 1a has approximately same assemblies and features as the angle adjustable connecting module 1 of the abovementioned embodiment and herein will not be described in details.

The angle adjustable connecting module 1a has a connecting surface A' cooperated with the game controller 2. The connecting surface A' is a multi-angle arc surface, thereby the strength of fixing the game controller 2 to the connecting module 1a can be enhanced to increase the stability since the connecting surface A' matches the design of the game controller 2. Please simultaneously refer to FIG. 1A, the connecting assembly 12a is detachably assembled with the game controller 2 along the assembling axis (equal to D2), and a part of the connecting portion 121a of the connecting assembly 12a, which is exposed to the casing 11a, can turn around the axis D1 to rotate an angle (equal to the angle θ) with respect to the assembling axis D2. Similarly, in the present embodiment, the angle θ is ranged from 15 degrees to 20 degrees, but it is not limited thereto. In other embodiments, other angles are also allowed, and a radian of the casing can be appropriately changed to match the game controller used thereof.

Figure 4:
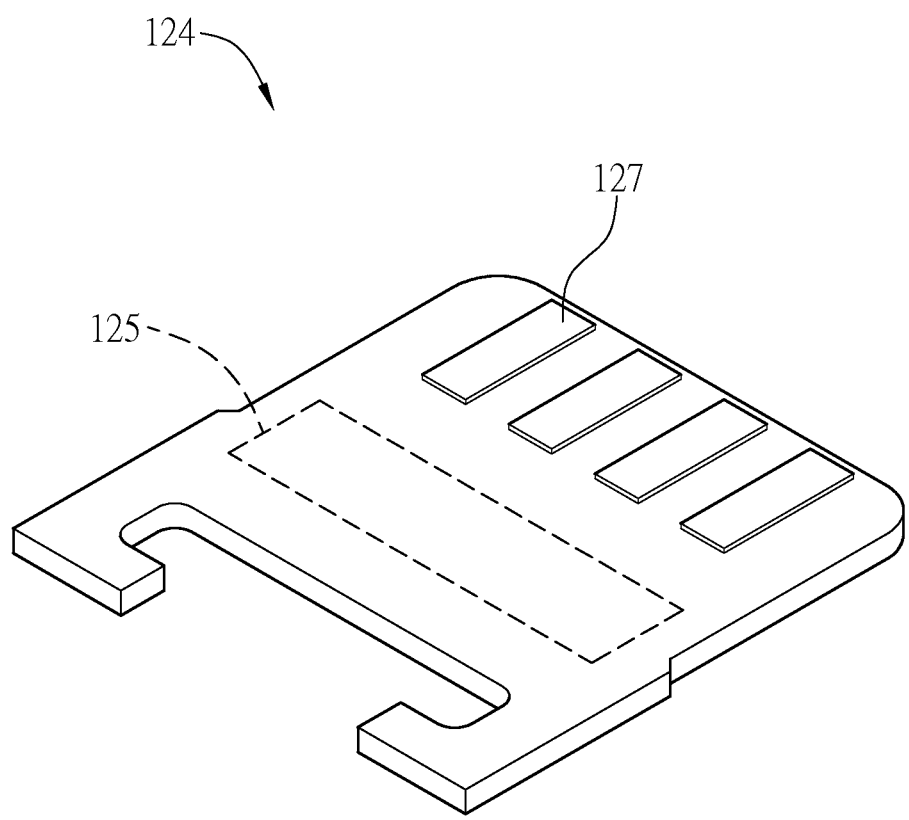
FIG. 4 is an independently enlarged schematic diagram showing a wireless receiving assembly of FIG. 2.

In addition, the connecting assembly 12a further comprises a wireless receiving assembly 124. Please simultaneously refer to FIG. 2, FIG. 3 and FIG. 4. FIG. 4 is an independently enlarged schematic diagram showing a wireless receiving assembly 124 of FIG. 2. The wireless receiving assembly 124 has an induction receiving coil 125 and a plurality of joints 127. The joints 127 are electrically connected with the pins 126. In the meantime the charge module 3 further comprises a wireless emitting assembly, and the wireless emitting assembly has an induction emitting coil. Therefore, when the charge module 3 is connected with an external power supply, the induction emitting coil of the wireless emitting assembly can be driven for induction coupling with the induction receiving coil 125 to generate a current within the connecting assembly 12a. When a ratio of voltage to current generated by the coupling of the connecting assembly 12a fits in with a predetermined range, the connecting portion 121a of the connecting assembly 12a is electrically conducted with the game controller 2 to process the charge. On the contrary, if it is not within the predetermined range (that is, the electric power generated by induction cannot be transmitted from the cooperated charge module), the connecting portion 121a will not be electrically conducted with the game controller 2 and process any operation to avoid damaging the assembly or the battery within the game controller 2.

In addition, a rigid friction generated as connecting with the game controller 2 can be avoided since the angle adjustable connecting module 1a has sufficient movability. In the meantime the crooked angle during connecting is also capable of being cushioned for maintaining the horizontal of the induction receiving coil 125 thus to have a better transmitting efficiency with the induction emitting coil to shorten the charge time.

Also, the combination of the game controller 2, the angle adjustable connecting module 1a and the charge module 3 can be various. For example, the game controller 2 and the angle adjustable connecting module 1a can be assembled first and then disposed on the charge module 3. Of course, the angle adjustable connecting module 1a also can be held on the charge module 3 first, and the game controller 2 is then assembled thereon when needed. The present invention is not limited thereto, thus the users will have larger flexibility of application.

According to the above, the angle adjustable connecting module of the present invention allows the connecting portion of the connecting assembly to be movably exposed by setting up an opening on the casing, thereby the wear problems, which are generated at a port of the connecting portion or the game controller because the arc surface appearance of the game controller results in misalignment or the incorrect direction of applying force, can be avoided.

Compared to the conventional fixed connecting assembly, which is limited to be plugged or unplugged with a single angle during assembling due to the lacks of the movability and thereby damage the connector easily, the angle adjustable connecting module of the present invention makes the angle more flexible by disposing the shaft and the elastic member to decrease the wear problems and be used easily. Also, under repeatedly and frequently using, the quality and efficiency of the transmitting in connecting can be maintained, and the lifetime of the electronic product can be extended. More particularly, when the present invention is used for the charging of the game controller, because the reduction of the wear, the connecting module and the game controller can be tightly connected with each other to ensure that the charging can be effectively processed even though it has been used for many times.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. An angle adjustable connecting module, comprising:
a casing having an opening; and
a connecting assembly including a connecting portion, a shaft and at least an elastic member, wherein the connecting portion is connected with the shaft, an end of the elastic member is connected with the shaft and the other end of the elastic member is connected with the casing, and the shaft is rotatably disposed at the casing for allowing a part of the connection portion to be movably exposed to the opening, and the connection portion is rotated within the opening by the shaft.

2. The angle adjustable connecting module according to claim 1, wherein the elastic member is a torsion spring.

3. The angle adjustable connecting module according to claim 1, wherein the connecting portion comprises a connector of universal serial bus, a connector of firewire or a connector of high definition multimedia interface.

4. The angle adjustable connecting module according to claim 1, further comprising:
a charge module assembled with the casing.

5. The angle adjustable connecting module according to claim 4, wherein the charge module comprises a wireless charge module or a wired charge module.

6. The angle adjustable connecting module according to claim 1, wherein the connecting portion is connected with a game controller and the game controller is cooperated with the connecting assembly through an arc surface.

7. The angle adjustable connecting module according to claim 1, wherein the connecting portion is connected with a game controller along a connecting direction, the connecting direction is perpendicular to the shaft, and the connecting portion is capable of rotating an angle with respect to the connecting direction.

8. The angle adjustable connecting module according to claim 7, wherein the angle is ranged from 15 degrees to 20 degrees.

* * * * *